United States Patent [19]
Taylor

[11] Patent Number: 4,924,649
[45] Date of Patent: May 15, 1990

[54] CORNER ASSEMBLY FOR A SKYLIGHT FRAME
[75] Inventor: John R. Taylor, Irving, Tex.
[73] Assignee: Innovative Building Products, Inc., Dallas, Tex.
[21] Appl. No.: 379,479
[22] Filed: Jul. 13, 1989
[51] Int. Cl.$^5$ .............................................. E04C 2/38
[52] U.S. Cl. ...................................... 52/656; 403/402
[58] Field of Search ................ 52/656, 200; 403/401, 403/402, 403

[56] References Cited
U.S. PATENT DOCUMENTS

| | | | |
|---|---|---|---|
| 3,163,930 | 1/1965 | Stanley | 52/656 X |
| 3,429,602 | 2/1969 | Dirilgen | 52/656 X |
| 3,717,955 | 2/1973 | Urbanick | 52/656 X |
| 4,630,386 | 12/1986 | Wilson | 403/403 X |
| 4,840,440 | 6/1989 | Dieter | 403/402 X |

FOREIGN PATENT DOCUMENTS
1139255  1/1969  United Kingdom ............... 403/402

Primary Examiner—Carl D. Friedman
Attorney, Agent, or Firm—Kenneth R. Glaser

[57] ABSTRACT

A corner assembly for a skylight frame includes first and second frame members having mitered ends and inner and outer surfaces. At least one inner joint member has first and second wings extending from a central rib. At least one outer joint member has two lateral members end walls defining a longitudinal, centrally located groove between the lateral members. The groove walls are closely interfitted with the rib, with the wings contacting end portions of the frame member inner surfaces and with the lateral members contacting end portions of the frame member outer surfaces.

33 Claims, 3 Drawing Sheets

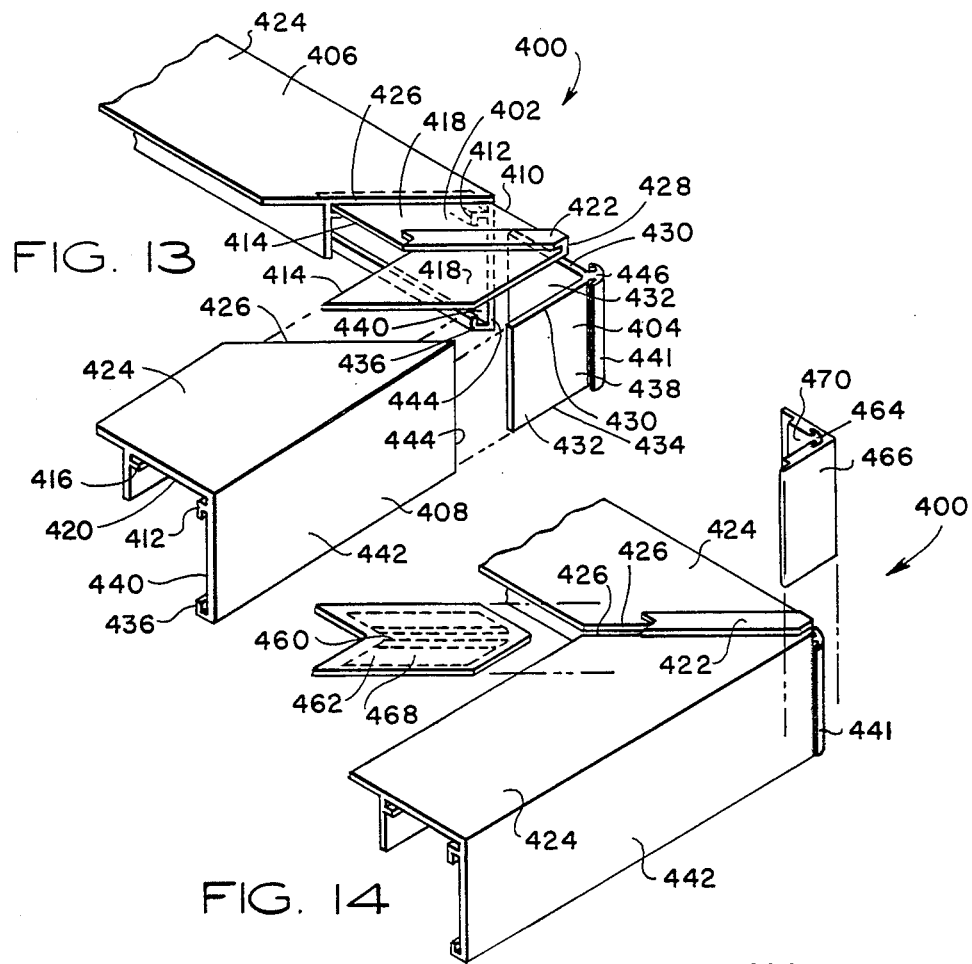
FIG. 13
FIG. 14
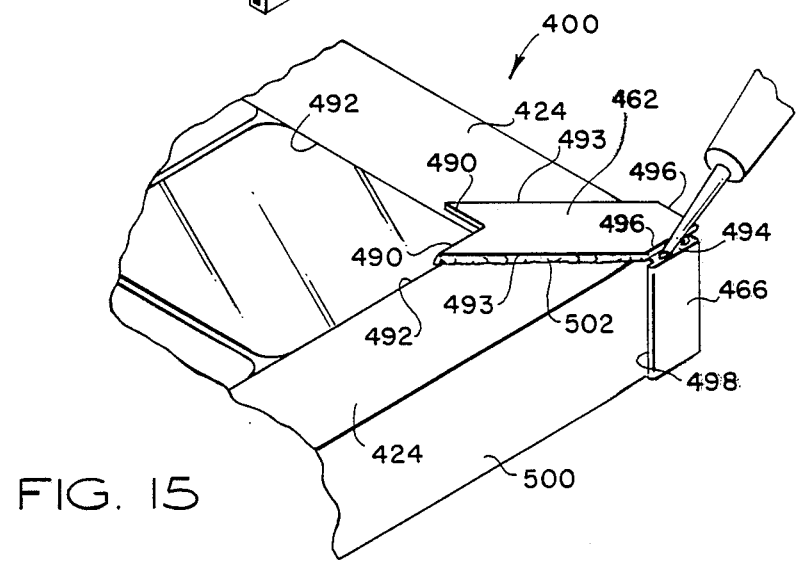
FIG. 15

CORNER ASSEMBLY FOR A SKYLIGHT FRAME

TECHNICAL FIELD

This invention relates to the art of building construction, and more particularly to structural frames for windows, skylights, and the like.

BACKGROUND OF THE INVENTION

Skylights are window units that transmit light through an opening in a building roof, and have long been used to produce aesthetic lighting effects in residential and commercial building construction. Typically, a frame structure is utilized to support the light-transmitting central portion and weathertightly-seal the assembly to the supporting roof structure. Preferably, skylight assemblies are easily assemblable on-site, because of the complexity of installing such assemblies on pitched roof surfaces.

It is known to provide a pre-assembled, welded skylight frame installed as a unitary body. This type of skylight frame suffers from the drawback of bulkiness, which hinders efficient installation. Another type of known skylight frame assembly utilizes separate frame members joined together at the corners on-site. This second type of prior skylight frame assembly has tended to be difficult to install, requiring tools and a relatively high degree of skill and experience on the part of the installer.

Thus, there presently exists a need for a skylight frame assembly that is assemblable on-site from separate members, but which has a corner assembly which is efficiently assembled and yields adequate structural and sealing characteristics.

SUMMARY OF THE INVENTION

The present invention solves the problems associated with prior skylight frames by providing a corner assembly for separate frame members which is assemblable on-site. The corner assembly is formed from frame members intersecting at an angle. An inner joint member has wings extending laterally from a central rib, which wings preferably are retained by grooves in mitered ends of the frame members, with the central rib extending beyond the outer surfaces of the frame member ends. An outer joint member has two lateral members and walls defining a longitudinal, centrally located groove adapted to be closely interfitted with the inner joint member central rib. In a preferred embodiment, a pair of inner and outer joint members are provided for both horizontal and vertical surfaces of the frame member ends.

The invention described herein constitutes an improvement of the invention described in co-pending patent application Ser. No. 07/236,169 filed Aug. 25, 1988, such description being incorporated by reference herein.

BRIEF DESCRIPTION OF THE DRAWINGS

A more complete understanding of the invention and its advantages will be apparent from the Detailed Description of the Preferred Embodiment, taken in conjunction with the accompanying Drawings, in which:

FIGS. 13, 14 and 15 are schematic views illustrating the steps of assembling the corner assembly.

DETAILED DESCRIPTION OF THE PREFERRED EMBODIMENT

Figure 1:
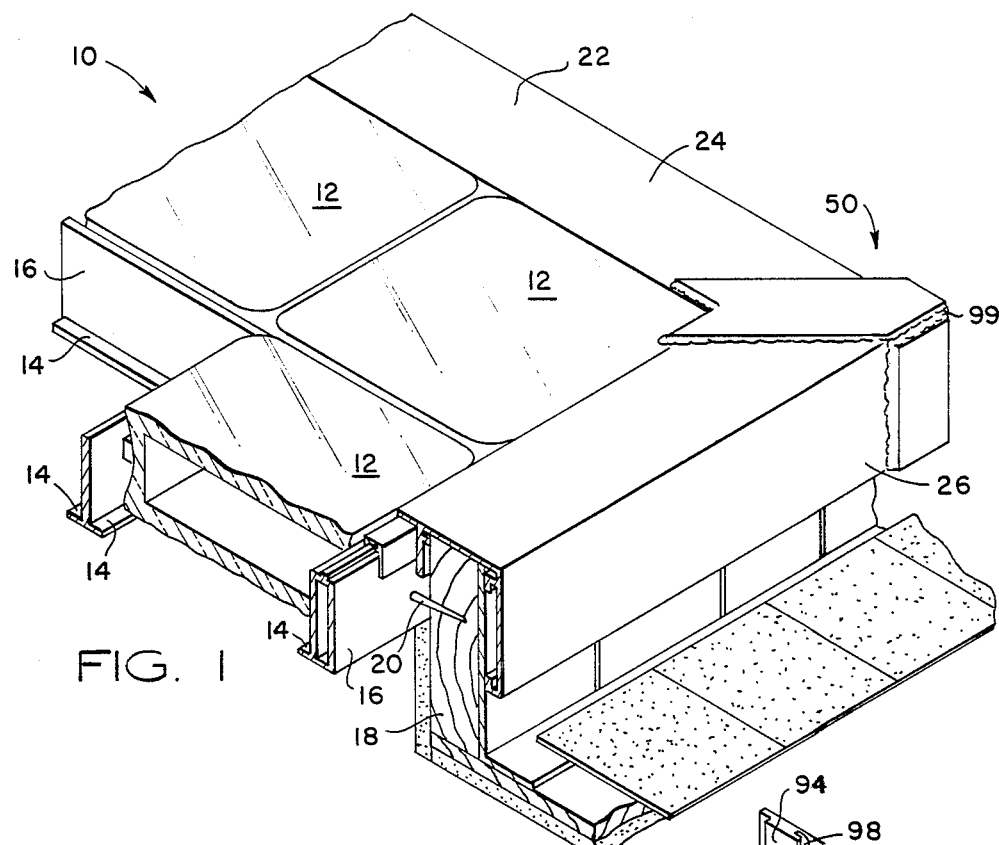
FIG. 1 is partially broken away perspective view of an installed skylight utilizing the corner assembly of the present invention.

Referring initially to FIG. 1, a skylight 10 includes glass blocks 12 being seated resting within pockets on a support plane defined by inwardly protruding shelf lips 14 of framing bars 16. The framing bars 16 about the periphery of the assembly are secured to wooden framing members 18 by way of fasteners 20. Structural integrity is provided by frame 22, which includes frame members 24 and 26. It will be recognized that FIG. 1 illustrates only one corner of skylight 10, which corner is typical of the remaining corners of the assembly.

Figure 2:
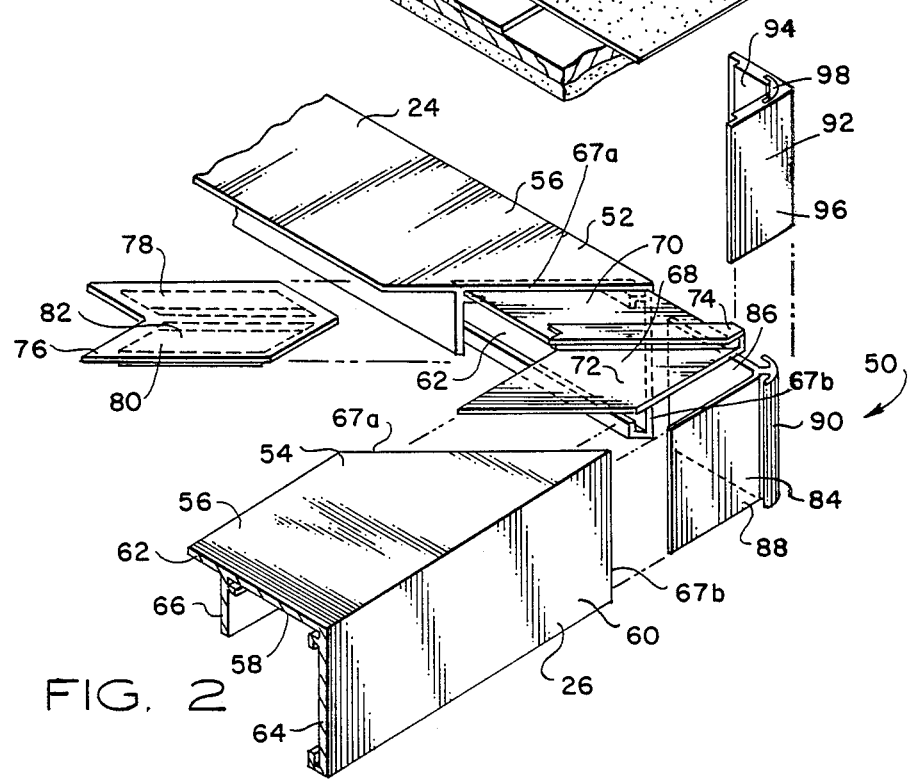
FIG. 2 is an exploded view of the corner assembly of FIG. 1.

Referring now to FIG. 2 in addition to FIG. 1, corner assembly 50 includes mitered ends 52 and 54 of first and second frame members 24 and 26, respectively. Each of the first and second frame members includes outer horizontal surfaces 56, inner horizontal surfaces 58, outer vertical surfaces 60 and inner vertical surfaces 62. The frame members are defined by a transverse cross-sectional configuration including a horizontal leg 62 joined to outer vertical leg 64 and inner vertical leg 66. The frame members include horizontal end edges 67a and vertical end edges 67b.

An inner horizontal joint member 68 has first wing 70 and second wing 72 extending from a central horizontal rib 74. Outer horizontal joint member 76 has two lateral members 78 and walls 82 defining a longitudinal, centrally located horizontal groove between lateral members 78 and 80.

An inner vertical joint member 84 has first wing 86 and second wing 88 extending from central vertical rib 90. Outer vertical joint member 92 has two lateral members 94 and 96 and walls 98 defining a longitudinal, centrally located vertical groove between lateral members 92 and 94.

As will be described in detail below, the frame members 24 and 26 include a number of internal longitudinal grooves which lock the wings of the inner joint members 68 and 84 in their respective positions once the grooves in the outer joint members 76 and 92 are engaged with the ribs 74 and 90, respectively, which extend beyond the outer surfaces of the frame members. As shown in FIG. 1, beads of caulking 99 seal the corner assembly 50.

Figure 3:
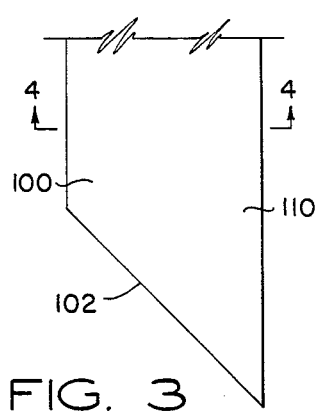
FIG. 3 is a plan view of a frame member end.
Figure 4:
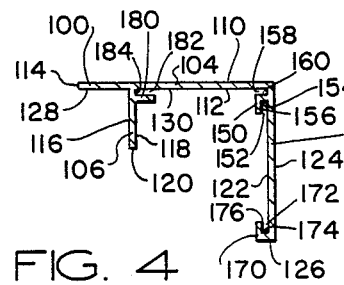
FIG. 4 is a sectional view taken along lines 4—4 of FIG. 3.

Referring now to FIGS. 3 and 4, preferably each of the frame members has an identical cross section, as shown in FIG. 4. The frame member 100 is preferably an extruded aluminum construction having a mitered end with horizontal end edges 102 and vertical end edges (not shown). The generally "F"-shaped transverse cross-sectional configuration includes horizontal leg 104 and inner and outer vertical legs 106 and 108, respectively. Horizontal leg 104 has planar upper and lower surfaces 110 and 112, respectively, and an inner edge 114. Inner vertical leg 106 has planar inner and outer surfaces 116 and 118, respectively, and a lower edge 120. Outer vertical leg 108 has planar inner and outer surfaces 122 and 124, respectively, and lower edge 126. Inner and outer vertical legs 106 and 108, respectively, intersect horizontal leg 104 at right angles thereto, with inner vertical leg 106 being joined to a medial portion of horizontal leg lower surface 112 such that the lower surface is divided into inner and outer portions 128 and 130, respectively.

In the preferred embodiment, inner vertical leg 106 is about one inch in length, and outer vertical leg 108 is about three inches in length. The horizontal leg lower surface inner portion 128 is about one inch in length, and horizontal leg lower surface outer portion is about two inches in length, for an overall length for horizontal leg 104 of about three inches.

An upper finger 150 extends inwardly and downwardly from an extreme upper portion of outer vertical leg inner surface 122. Upper finger 150 has a generally "L"-shaped transverse cross-sectional configuration and is spaced closely to horizontal leg lower surface outer portion 130. A downwardly-facing upper longitudinal groove 152 is formed between the extreme upper portion of outer vertical leg inner surface 122 and horizontal and vertical inner surfaces 154 and 156, respectively, of upper finger 150. An inwardly-facing outer longitudinal groove 158 is formed between the extreme upper portion of outer vertical leg inner surface 122, a horizontal upper surface 160 of upper finger 150, and an extreme outer portion of horizontal leg lower surface outer portion 130.

A lower finger 170 extends inwardly and upwardly from lower edge 126 of outer vertical leg 108, and has a generally "L"-shaped transverse cross-sectional configuration. An upwardly-facing lower longitudinal groove 172 is formed between and extreme lower portion of outer vertical leg inner surface 122 and horizontal and vertical inner surfaces 174 and 176, respectively, of lower finger 170.

An inner finger 180 extends inwardly from an an extreme upper portion of inner vertical leg outer surface 118 and has a generally rectangular transverse cross-sectional configuration. An outwardly-facing inner longitudinal groove 182 is formed between the extreme upper portion of inner vertical leg outer surface 118, and extreme inner portion of horizontal leg lower surface outer portion 130, and a vertical inner surface 184 of inner finger 180.

Upper and lower longitudinal grooves 152 and 172, respectively, are disposed in a spaced, opposing open-faced relationship, as are outer and inner longitudinal grooves 158 and 182, respectively.

Figure 5:
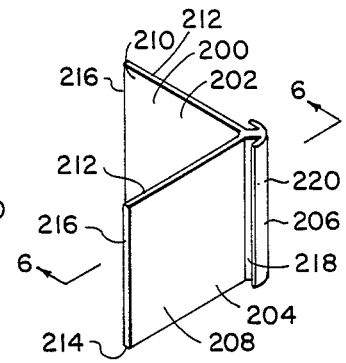
FIG. 5 is a perspective view of an inner vertical joint member.
Figure 6:
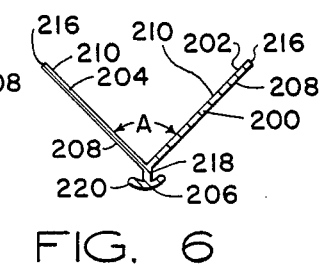
FIG. 6 is a sectional view taken along lines 6—6 of FIG. 5.

Referring now to FIGS. 5 and 6, an inner vertical joint member 200 is an extruded aluminum body having first and second wings 202 and 204, respectively, extending from a central vertical rib 206. Preferably, wings 202 and 204 are thin, rectangular-shaped bodies being disposed at an included angle A of about 45° and having planar outer surfaces 208 and planar inner surfaces 210. Wings 202 and 204 also have upper and lower edges 212 and 214, respectively, joined perpendicularly to vertical rib 206 and extending to lateral edges 216. Vertical rib 206 is parallel to wing lateral edges 216 and extends from wing outer surfaces 208. Vertical rib 206 has a generally mushroom-shaped transverse cross-sectional configuration with an inner leg 218 extending to a centrally located curved outer leg 220.

Figure 7:
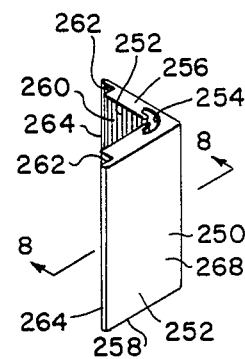
FIG. 7 is a perspective view of an outer vertical joint member.
Figure 8:
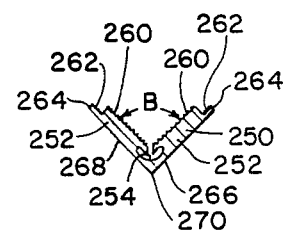
FIG. 8 is a sectional view taken along lines 8—8 of FIG. 7.

Referring now to FIGS. 7 and 8, outer vertical joint member 250 is an extruded aluminum body having two lateral members 252 and walls 254 defining a longitudinal, centrally located mushroom-shaped groove dimensioned to closely interfit central rib 206 of inner vertical joint member 200. Outer vertical joint member 250 has linear upper and lower edges 256 and 258 and serrated lateral member inner walls 260. Edge walls 262 define an angled groove between inner walls 260 and edges 264. First and second planar outer surfaces 266 and 268, respectively intersect at corner edge 270. Included angle B between inner surfaces 260 is about 45°, and inner surfaces 260 and outer surfaces 266 and 268 are parallel, such that the included angle between outer surfaces 266 and 268 is also about 45°. Upper and lower edges 256 and 258, respectively, are perpendicularly joined to corner edge 270.

Figure 9:
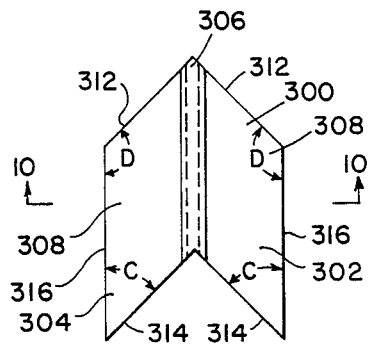
FIG. 9 a plan view of an inner horizontal joint member.
Figure 10:
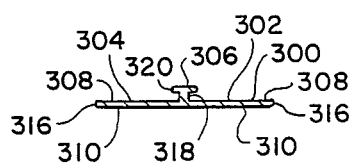
FIG. 10 is a sectional view taken along lines 10—10 of FIG. 9.

Referring now to FIGS. 9 and 10, inner horizontal joint member 300 is an extruded aluminum body having first and second wings 302 and 304, respectively, extending from a central horizontal rib 306. Wings 302 and 304 are thin, diamond-shaped bodies with co-planar upper surfaces 308 and co-planar lower surfaces 310. Wings 302 and 304 have angled inner and outer edges 312 and 314, respectively joined to horizontal rib 306 and extending to lateral edges 316. Included inner acute angles C between lateral and inner edges 316 and 314, respectively, are about 45°. Included outer obtuse angles D between lateral and outer edges 316 and 312, respectively, are about 135°. Horizontal rib 306 is parallel to lateral edges 316 and extends from upper surfaces 308. Horizontal rib 306 has a generally "T"-shaped transverse cross-sectional configuration with a vertical leg 318 extending to a centrally located horizontal leg 320.

Figure 11:
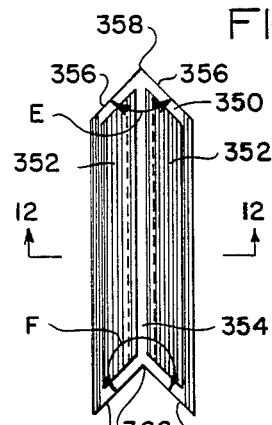
FIG. 11 is a bottom view of an outer horizontal joint member.
Figure 12:
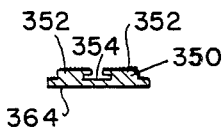
FIG. 12 is a sectional view taken along lines 12—12 of FIG. 11.

Referring now FIGS. 11 and 12, outer horizontal joint member 350 is an extruded aluminum body having two lateral members 352 and walls 354 defining a longitudinal, centrally located "T"-shaped groove. Outer edges 356 intersect at point 358, and inner edges 360 intersect at point 362. Outer horizontal joint member 350 has a planar upper surface 364 spanning lateral members 352. Outer edges 356 are joined at an included acute angle E of about 45°, and inner edges 360 are joined at an included acute angle F of about 135°.

Referring now to FIGS. 13, 14 and 15, the corner assembly 400 is assembled by initially interfitting the wings of inner horizontal and vertical joint members 402 and 404 with the upper, lower, inner and outer longitudinal grooves formed in side members 406 and 408. Specifically, the outer edges 410 of inner horizontal joint member 402 are engaged with the outer longitudinal groove formed by upper finger 412, as described above with respect to FIG. 4. Inner edges 414 are engaged with end portions of the inner longitudinal grooves formed by inner finger 416. The dimensions of the wings and inner and outer longitudinal grooves are dimensioned such that wing upper surfaces 418 are fixed in contact with end portions of the frame member horizontal leg lower surface outer portions 420. The horizontal rib horizontal leg 422 is located above the frame member horizontal leg upper surfaces 424, as best shown in FIG. 14. Frame member horizontal end edges 426 contact a lower portion of the horizontal rib vertical leg 428.

Similarly, upper edges 430 of inner vertical joint member wings 432 are engaged with end portions of the upper longitudinal groove formed by upper member 412, as described above in connection with FIG. 4. Lower edges 434 of wings 432 are engaged with end portions of lower longitudinal grooves formed by lower fingers 436. Wing outer surfaces 438 are fixed in contact with end portions of the frame member outer vertical leg inner surfaces 440, with the vertical rib outer leg 441 located outside the frame member vertical leg outer surfaces 442, and the frame member vertical end edges 444 being in contact with an inner portion of vertical rib inner leg 446, as best shown in FIG. 14.

Groove walls 460 of outer horizontal joint member 462 closely interfit with the horizontal rib horizontal leg 442 by way of sliding engagement, as illustrated in FIG. 14. Similarly, walls 464 of outer vertical joint member 466 closely interfit with vertical rib outer leg 441 by sliding engagement. Upon engagement, the lateral member lower walls 468 contact end portions of the frame member horizontal leg upper surfaces 424, and the lateral member inner walls 470 contact end portions of frame member vertical leg outer surfaces 442.

As best shown in FIG. 15, the outer horizontal joint members 462 is slidably translated with respect to the inner horizontal joint member such that inner edges 490 of outer horizontal joint member 462 are co-planar with and spaced apart from end portions of the frame member horizontal leg inner edges 492. Lateral edges 493 are spaced above frame member upper surfaces 424. Upper edges 494 of outer vertical joint member 466 are co-planar with and spaced apart from outer horizontal joint member outer edges 496, and lateral edges 498 are spaced apart from frame member outer surfaces 500. The assembly is completed by running a bead of caulk 502 completely around all the spaces between the frame members and the outer joint members, with the completed caulking best illustrated in FIG. 1.

Whereas the present invention has been described with specific embodiments thereof, it will be understood that various changes and modifications will be suggested to one skilled in the art and it is intended to encompass such changes and modifications as fall within the scope of the appended claims.

I claim:

1. A corner assembly for a skylight frame, comprising:
   (a) first and second frame members having mitered ends and inner and outer surfaces;
   (b) at least one inner joint member having first and second wings extending from a central rib;
   (c) at least one outer joint member having two lateral members and walls defining a longitudinal, centrally located groove between said lateral members, with said groove walls being closely interfitted with said rib, said wings contacting end portions of said frame member inner surfaces and said lateral members contacting end portions of said frame member outer surfaces.

2. The corner assembly of claim 1 wherein said frame member inner and outer surfaces are horizontal.

3. The corner assembly of claim 1 wherein said frame member inner and outer surfaces are vertical.

4. A corner assembly for a skylight frame, comprising:
   (a) first and second frame members having mitered ends, inner and outer horizontal surfaces, and inner and outer vertical surfaces;
   (b) an inner horizontal joint member having first and second wings extending from a central horizontal rib;
   (c) an outer horizontal joint member having two lateral members and walls defining a longitudinal, centrally located horizontal groove between said lateral members, with said horizontal groove walls being closely interfitted with said horizontal rib, said wings contacting end portions of said frame member inner horizontal surfaces and said lateral members contacting end portions of said frame member outer horizontal surfaces;
   (d) an inner vertical joint member having first and second wings extendinq from a central vertical rib; and
   (e) an outer vertical joint member having two lateral members and walls defining a longitudinal, centrally located vertical groove between said lateral members, with said vertical groove walls being closely interfitted with said vertical rib, said wings contacting end portions of said frame member inner vertical surfaces and said lateral members contacting end portions of said frame member outer vertical surfaces.

5. The corner assembly of claim 4 with each said frame member being defined by a transverse cross-sectional configuration including a horizontal leg joined to at least one vertical leg, said inner and outer horizontal surfaces being disposed on said horizontal leg, and said inner and outer vertical surfaces being disposed on said vertical leg.

6. The corner assembly of claim 5 with each said frame member being defined by a generally "F"-shaped transverse cross-sectional configuration, with said horizontal leg having planar upper and lower surfaces and an inner edge, and inner and outer vertical legs each having planar inner and outer surfaces and lower edges, with said inner and outer vertical legs intersecting said horizontal leg at right angles thereto.

7. The corner assembly of claim 6 with said inner vertical leg being joined to a medial portion of said horizontal leg lower surface such that said horizontal leg lower surface is divided into inner and outer portions.

8. The corner assembly of claim 7 with said inner vertical leg being about 1 inch in length, said outer vertical leg being about 3 inches in length, said horizontal leg lower surface inner portion being about 1 inch in length, and said horizontal leg lower surface outer portion being about 2 inches in length.

9. The corner assembly of claim 5:
   with an upper finger extending inwardly and downwardly from an upper portion of said vertical leg inner surface, said upper finger being disposed such that a downwardly-facing upper longitudinal groove is formed between said upper portion of said vertical leg inner surface and surfaces of said upper finger;
   with a lower finger extending inwardly and upwardly from a lower portion of said vertical leg inner surface, said lower finger being disposed such that an upwardly-facing lower longitudinal groove is formed between said lower portion of said vertical leg inner surface and surfaces of said lower finger;

said upper and lower longitudinal grooves being disposed in a spaced, opposing open-faced relationship; and upper edges of said vertical joint member wings being engaged with end portions of said upper longitudinal grooves of said frame members, lower edges of said wings being engaged with end portions of said lower longitudinal grooves of said frame members, such that wing outer surfaces are fixed in contact with end portions of said frame member vertical leg inner surfaces, with said vertical rib extending to a location outside said frame member vertical leg outer surfaces, and frame member vertical end edges being in contact with an inner portion of said vertical rib.

10. The corner assembly of claim 9 with said upper finger having a generally "L"-shaped transverse cross-sectional configuration and being spaced closely to said horizontal leg lower surface, such that said upper longitudinal groove is formed between an extreme upper portion of said vertical leg inner surface and horizontal and vertical inner surfaces of said upper finger.

11. The corner assembly of claim 9 with said lower finger having a generally "L"-shaped transverse cross-sectional configuration, such that said lower longitudinal groove is formed between an extreme lower portion of said vertical leg inner surface and horizontal and vertical inner surfaces of said lower finger.

12. The corner assembly of claim 10:

with said upper finger extending inwardly from an upper portion of said vertical leg inner surface spaced closely to said horizontal leg lower surface, said upper finger being disposed such that an inwardly-facing outer longitudinal groove is formed between said upper portion of said vertical leg inner surface, said horizontal leg lower surface and an upper surfaces of said upper finger;

with an inner finger extending inwardly from said horizontal leg lower surface at a location spaced inwardly of said vertical leg inner surface, said inner finger being disposed such that an outwardly-facing inner longitudinal groove is formed between said horizontal leg lower surface and surfaces of said inner finger;

said outer and inner longitudinal grooves being disposed in a spaced, opposing open-faced relationship; and outer edges of said horizontal joint member wings being engaged with end portions of said outer longitudinal grooves of said frame members, inner edges of said wings being engaged with end portions of said inner longitudinal grooves of said frame members, such that wing outer surfaces are fixed in contact with end portions of said frame member horizontal leg inner surfaces, with said horizontal rib extending to a location outside said frame member horizontal leg outer surfaces, and frame member horizontal end edges being in contact with an inner portion of said horizontal rib.

13. The corner assembly of claim 12 with said horizontal inner joint member wings being thin, diamond-shaped bodies with coplanar upper surfaces and coplanar lower surfaces.

14. The corner assembly of claim 13 with said horizontal inner joint member wings having angled inner and outer edges joined to said horizontal rib and extending to lateral edges, with included inner acute angles between said lateral and inner edges being about 45 degrees and included outer obtuse angles between said lateral and outer edges being about 135 degrees.

15. The corner assembly of claim 14 with said horizontal rib being parallel to said wing lateral edges and extending from said wing upper surfaces.

16. The corner assembly of claim 15 with said horizontal rib having a generally "T"-shaped transverse cross-sectional configuration with a vertical leg extending to a centrally located horizontal leg.

17. The corner assembly of claim 16 with said outer edges of said wings being engaged with end portions of said outer longitudinal grooves of said frame members, said inner edges of said wings being engaged with end portions of said inner longitudinal grooves of said frame members, such that said wing upper surfaces are fixed in contact with end portions of said frame member horizontal leg lower surface outer portions, with said horizontal rib horizontal leg extending to a location above said frame member horizontal leg upper surfaces, and said frame member horizontal end edges being in contact with a lower portion of said horizontal rib vertical leg.

18. The corner assembly of claim 17 with said outer horizontal joint member walls defining a "T"-shaped groove.

19. The corner assembly of claim 18 with said outer horizontal joint member having intersecting outer and inner edges.

20. The corner assembly of claim 19 with said outer horizontal joint member having serrated lateral member lower walls.

21. The corner assembly of claim 20 with said outer horizontal joint member having a planar upper surface spanning the lateral members.

22. The corner assembly of claim 21 with said outer edges being joined at an included acute angle of about 45 degrees and said inner edges being joined at an included obtuse angle of about 135 degrees.

23. The corner assembly of claim 22 with said groove walls being closely interfitted with a horizontal rib horizontal leg and an upper portion of a horizontal rib vertical leg.

24. The corner assembly of claim 9 with said inner vertical joint member wings being thin, rectangular-shaped bodies being disposed at an included angle of about 45 degrees and having planar outer surfaces and planar inner surfaces.

25. The corner assembly of claim 24 with said inner vertical joint member wings having upper and lower edges joined perpendicularly to said vertical rib and extending to lateral edges.

26. The corner assembly of claim 25 with said vertical rib being parallel to said wing lateral edges and extending from said wing outer surfaces.

27. The corner assembly of claim 26 with said vertical rib having a generally mushroom-shaped transverse cross-sectional configuration with an inner leg extending to a centrally located curved outer leg.

28. The corner assembly of claim 27 with said outer vertical joint member having linear upper and lower edges.

29. The corner assembly of claim 28 with said outer vertical joint member having serrated lateral member inner walls.

30. The corner assembly of claim 29 with said outer vertical joint member having first and second planar outer surfaces intersecting at a corner edge and having an included angle therebetween of about 45 degrees.

31. The corner assembly of claim 30 with said outer vertical joint member having linear upper and lower edges being perpendicularly joined to said corner edge.

32. A corner assembly for a skylight frame, comprising:

(a) first and second extruded aluminum frame members having mitered ends with horizontal and vertical end edges, with each said frame member being defined by a generally "F"-shaped transverse cross-sectional configuration, said configuration including:
a horizontal leg and inner and outer vertical legs,
said horizontal leg having planar upper and lower surfaces and an inner edge,
said inner and outer vertical legs each having planar inner and outer surfaces and lower edges,
said inner and outer vertical legs intersecting said horizontal leg at right angles thereto,
said inner vertical leg being joined to a medial portion of said horizontal leg lower surface such that said horizontal leg lower surface is divided into inner and outer portions,
said inner vertical leg being about 1 inch in length, said outer vertical leg being about 3 inches in length, said horizontal leg lower surface inner portion being about 1 inch in length, said horizontal leg lower surface outer portion being about 2 inches in length,
an upper finger extending inwardly and downwardly from an extreme upper portion of said outer vertical leg inner surface, having generally "L"-shaped transverse cross-sectional configuration and being spaced closely to said horizontal leg lower surface outer portion, such that a downwardly-facing upper longitudinal groove is formed between said extreme upper portion of said outer vertical leg inner surface and horizontal and vertical inner surfaces of said upper finger, and an inwardly-facing outer longitudinal groove is formed between said extreme upper portion of said outer vertical leg inner surface, a horizontal upper surface of said upper finger, and an extreme outer portion of said horizontal leg lower surface outer portion,
a lower finger extending inwardly and upwardly from a lower edge of said outer vertical leg and having a generally "L" shaped transverse cross-sectional configuration, such that an upwardly-facing lower longitudinal groove is formed between an extreme lower portion of said outer vertical leg inner surface and horizontal and vertical inner surfaces of said lower finger,
an inner finger extending inwardly from an extreme upper portion of said inner vertical leg outer surface and having a generally rectangular transverse cross-sectional configuration, such that an outwardly-facing inner longitudinal groove is formed between said extreme upper portion of said inner vertical leg outer surface, an extreme inner portion of said horizontal leg lower surface outer portion, and a vertical inner surface of said inner finger, and
said upper and lower longitudinal grooves being disposed in a spaced, opposing open-faced relationship, and said outer and inner longitudinal grooves being disposed in a spaced, opposing open-faced relationship;

(b) an extruded aluminum inner horizontal joint member having first and second wings extending from a central horizontal rib,
said wings being thin, diamond-shaped bodies with coplanar upper surfaces and coplanar lower surfaces,
said wings having angled inner and outer edges joined to said horizontal rib and extending to lateral edges, with included inner acute angles between said lateral and inner edges being about 45 degrees and included outer obtuse angles between said lateral and outer edges being about 135 degrees,
said horizontal rib being parallel to said wing lateral edges and extending from said wing upper surfaces, and
said horizontal rib having a generally "T"-shaped transverse cross-sectional configuration with a vertical leg extending to a centrally located horizontal leg,
said outer edges of said wings being engaged with end portions of said outer longitudinal grooves of said frame members, said inner edges of said wings being engaged with end portions of said inner longitudinal grooves of said frame members, such that said wing upper surfaces are fixed in contact with end portions of said frame member horizontal leg lower surface outer portions, with said horizontal rib horizontal leg extending to a location above said frame member horizontal leg upper surfaces, and said frame member horizontal end edges being in contact with a lower portion of said horizontal rib vertical leg;

(c) an extruded aluminum outer horizontal joint member having two lateral members, walls defining a longitudinal, centrally located "T"-shaped groove, intersecting outer and inner edges, and serrated lateral member lower walls,
said outer horizontal joint member having a planar upper surface spanning the lateral members,
said outer edges being joined at: an included acute angle of about 45 degrees and said inner edges being joined at an included obtuse angle of about 135 degrees, and
said groove walls being closely interfitted with said horizontal rib horizontal leg and an upper portion of said horizontal rib vertical leg, such that said lateral member lower walls contact end portions of said frame member horizontal leg upper surfaces, with said inner edges being coplanar with and spaced apart from end portions of said frame member horizontal leg inner edges;

(d) an extruded aluminum inner vertical joint member having first and second wings extending from a central vertical rib,
said wings being thin, rectangular-shaped bodies being disposed at an included angle of about 45 degrees and having planar outer surfaces and planar inner surfaces, said wings having upper and lower edges joined perpendicularly to said vertical rib and extending to lateral edges, said vertical rib being parallel to said wing lateral edges and extending from said wing outer surfaces, and said vertical rib having a generally mushroom-shaped transverse cross-sectional configuration with an inner leg extending to a centrally located curved outer leg, said upper edges of said wings being engaged with end portions of said upper longitudinal grooves of said frame members, said lower edges of said wings being engaged with end portions of said lower longitudinal grooves of said frame members, such that said wing outer surfaces are fixed in contact with end portions of said frame member outer vertical leg inner surfaces, with said vertical rib outer leg extending to a location outside said frame member vertical leg outer surfaces, and said frame member vertical end edges being in contact with an inner portion of said vertical rib inner leg; and (e) an extruded aluminum outer vertical joint member having two lateral members, walls defining a longitudinal, centrally located mushroom-shaped groove, linear upper and lower edges, and serrated lateral member inner walls, said outer vertical joint member having first and second planar outer surfaces intersecting at a corner edge and having an included angle therebetween of about 45 degrees, said upper and lower edges being perpendicularly joined to said corner edge, and said groove walls being closely interfitted with said vertical rib outer leg and an outer portion of said vertical rib inner leg, such that said lateral member inner walls contact end portions of said frame member vertical leg outer surfaces, with said upper edges being coplanar with and spaced apart from said outer horizontal joint member outer edges, and said lower edges being coplanar with end portions of said frame member outer vertical leg lower edges.

33. A method of assembling a corner for a skylight frame, comprising the steps of:

inserting a first wing of an inner joint member into spaced longitudinal grooves formed in an inner surface of a first frame member;

inserting a second wing of said inner joint member into spaced longitudinal grooves formed in an inner surface of a second frame member; and interfitting an outer joint member onto said inner joint member by sliding engagement of a groove formed in said outer joint member with a central rib extending from said inner joint member between said first and second wings.

* * * * *